United States Patent [19]

Seeley

[11] 4,079,309

[45] Mar. 14, 1978

[54] METHOD FOR DETERMINING CHANGES IN EARTH RESISTIVITY BY MEASURING PHASE DIFFERENCE BETWEEN MAGNETIC FIELD COMPONENTS

[75] Inventor: Elwin W. Seeley, San Diego, Calif.

[73] Assignee: The United States of America as represented by the Secretary of the Navy, Washington, D.C.

[21] Appl. No.: 720,320

[22] Filed: Sep. 3, 1976

[51] Int. Cl.² .............................................. G01V 3/08
[52] U.S. Cl. ............................................ 324/6; 324/8
[58] Field of Search ........................... 324/3, 6, 7, 8, 9

[56] References Cited

U.S. PATENT DOCUMENTS

| 1,672,328 | 6/1928 | Loth | 324/7 |
|---|---|---|---|
| 1,718,352 | 6/1929 | Guilford | 324/6 |
| 1,843,407 | 2/1932 | Sundberg | 324/6 |
| 2,730,673 | 1/1956 | Jakosky | 324/7 |
| 2,731,596 | 1/1956 | Wait et al. | 324/6 |
| 3,594,633 | 7/1971 | Barringer | 324/7 X |
| 3,984,758 | 10/1976 | Millon | 324/6 |

FOREIGN PATENT DOCUMENTS

| 625,063 | 8/1961 | Canada | 324/3 |
|---|---|---|---|
| 654,474 | 12/1962 | Canada | 324/6 |

*Primary Examiner*—Gerard R. Strecker
*Attorney, Agent, or Firm*—R. S. Sciascia; G. J. Rubens; T. M. Phillips

[57] ABSTRACT

Method and apparatus for detecting tunnels beneath an area of the earth's surface wherein an oscillator couples a current into a linear conductor at the earth's surface to generate a magnetic field in the earth beneath the area. Phase angle measuring means measures phase difference between the vertical and horizontal components of the magnetic field at selected points along a line parallel to the linear conductor to detect abrupt changes in earth resistivity, changes in resistivity indicating the presence and horizontal position of a tunnel.

1 Claim, 3 Drawing Figures

U.S. Patent    March 14, 1978    4,079,309

METHOD FOR DETERMINING CHANGES IN EARTH RESISTIVITY BY MEASURING PHASE DIFFERENCE BETWEEN MAGNETIC FIELD COMPONENTS

BACKGROUND OF THE INVENTION

The present invention relates to a method and apparatus for detecting anomalies in earth resistivity, and particularly to such method and apparatus for detecting tunnels or other void spaces within the earth.

Systems for detecting tunnels within the earth have previously been suggested which require the measurement of mutual impedance between a long current-carrying wire placed at the earth's surface and the voltage in a receiving loop located away from the wire. The applicability of such systems, however, is generally limted to tunnels that are not too deep, have fairly large dimensions, and contain linear conductive structures, such as steel tracks (e.g., C. Bufe, et al, "Geophysical Studies in Tunnel Location" ECOM TR-00013-171, prepared by Willow Run Lab., Univ. of Michigan, September 1969; G. V. Keller, F. C. Frieschknecht "Electrical Methods in Geophysical Prospecting" Pergamon Press, New York 1966). There are increasing military as well as commercial requirements for a system enabling detection of tunnels which are deeper and smaller than those which may be practically detected by mutual impedance systems and which may not be provided with steel tracks or other linear conductive structure. In addition, it would be advantageous to realize a tunnel detection system which is free from errors which derive from errors in wire current and loop voltage.

SUMMARY OF THE INVENTION

The present invention discloses a method and apparatus for detecting changes in the earth resistivity, and is particularly well suited, but by no means limited, to applications which require the detection of a tunnel, or other space devoid of solid matter, beneath the earth surface. According to the invention, a magnetic field is generated by a linear conductor located at the earth surface in the general area above which a tunnel is known or suspected to be. The phase difference between the vertical and horizontal components of the magnetic field, which is a function of earth resistivity, is then measured at selected points along a line parallel to the linear conductor to determine anomalous resistivity changes, indicating the presence and horizontal position of a tunnel. A set of loop antennas, each having its axis parallel to one of the magnetic field components, is coupled to a phase detecting device to measure phase difference at each point. Since the invention relies on measurement of differential phase angle between two components of a magnetic field received at the same point, measurements are independent of the errors in wire current and receiving loop voltage which may occur in mutual impedance detection systems. In addition, the sensitivity of the present invention to detect tunnels at varying depths beneath the earth surface may be kept constant by the simple technique of appropriately adjusting magnetic field frequency.

OBJECTS OF THE INVENTION

An object of the present invention is to provide a new and improved system for detecting anomalies in earth resistivity.

Another object of the present invention is to provide a new and improved system for detecting the presence of a tunnel beneath a given area.

Another object of the present invention is to provide a new and improved system for determining the horizontal position of a tunnel beneath a given area of the earth surface.

Another object of the present invention is to provide a simple and highly mobile system for tunnel detection.

Other objects, advantages and novel features of the invention will become apparent from the following detailed description of the invention when considered in conjunction with the accompanying drawings.

DESCRIPTION OF THE PREFERRED EMBODIMENT

Figure 1:
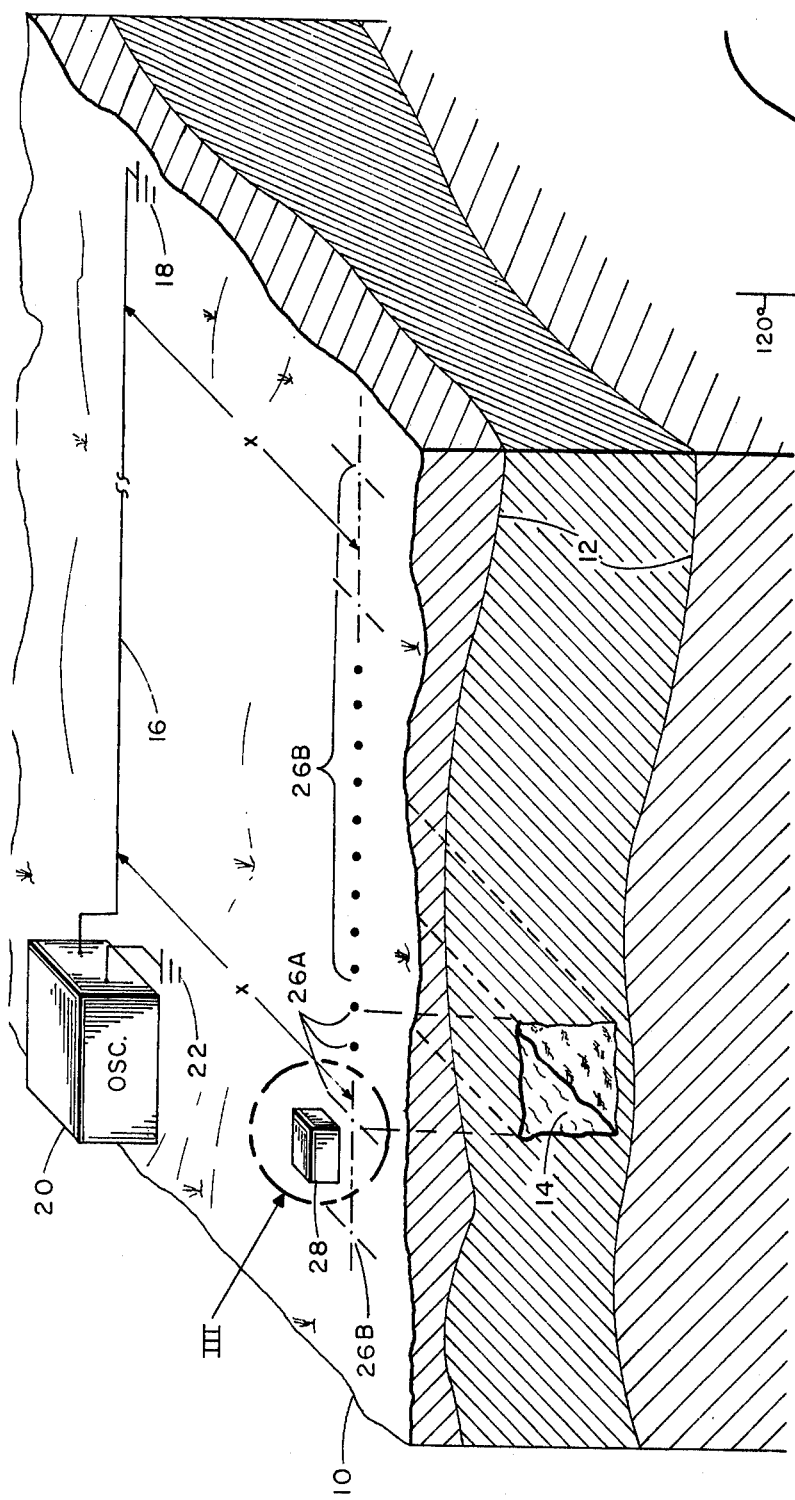
FIG. 1 shows an embodiment of the invention employed upon an area of the earth's surface.

Referring to FIG. 1, there is shown an area of the earth's surface 10 and the subsurface region beneath it, which comprises arbitrary strata of soil or other solid matter separated by lines 12. Tunnel 14, which may be an open-ended passageway or other space devoid of solid matter, may have a cross-sectional area of less than 4 square meters and passes through the subsurface region beneath area 10 at a depth which may be in excess of 30 meters, the cross-sectional dimensions of tunnel 14 being arbitrary. In addition, tunnel 14 may or may not contain a linear conductive structure such as steel tracks.

Linear conductor 16, which may be a conducting wire of 300 meters in length, is placed on area 10 of the earth's surface, one end being grounded to the earth through ground stake 18 and the other being connected to oscillator 20. Oscillator 20 couples a current having a frequency $f$, which may be varied within the range 10 KHz–100 Khz, into conductor 16, and the ground of oscillator 20 is coupled to the earth through ground stake 22.

According to well known principles, the current in conductor 16 generates a magnetic field of frequency $f$ in the subsurface region beneath area 10. The magnetic field has measurable vertical and horizontal components at any selected point 26A or 26B in area 10, the selected point being an arbitrary distance $x$ from conductor 16. The vertical component is perpendicular to the earth's surface at the selected point, and the horizontal component is in the plane of the earth's surface at the point and perpendicular to the direction of conductor 16. All points 26A in FIG. 1 are located directly above a cross-section of tunnel 14 and all points 26B are not located above any cross-section of tunnel 14.

The phase difference $\phi$ between the vertical and horizontal components of the magnetic field at any point 26A or 26B is linearly related to "P" factor over a selected range of values of "P" factor. "P" factor is defined as $x\sqrt{2\pi f \mu / \rho}$ wherein $\mu = 4\pi(10^{-7})$ and $\rho$ is the earth resistivity of the subsurface region directly beneath a point of area 10 a distance $x$ from conductor 16, earth resistivity beneath any point 26A being measurably different from the resistivity beneath any point 26B. Consequently, if each point 26A and each point 26B is on a line parallel to and a distance $d$ from conductor 16 so that $x = d$ for all points, for a magnetic field of constant frequency the value of phase difference $\phi$ at any point 26A will be $\phi_A \pm \Delta\phi_A$ and the value of $\phi$ at any point 26B will be $\phi_B \pm \Delta\phi_B$, the quantities $\phi_A \pm \Delta\phi_A$ and $\phi_B \pm \Delta\phi_B$ being measurably different.

From the above principles the presence or absence of a tunnel in the subsurface region beneath area 10 may be determined by measuring phase difference $\phi$ at a succession of points spaced a selected distance apart along a line which is a distance $d$ from conductor 16. Measurements may be made by successively placing phase difference measuring means 28 at each point. If $\phi$ is observed to abruptly change between a measurement made at any point within a segment of the line and a measurement made at any other point on the line, indicating an abrupt change in underlying earth resistivity, the presence of a tunnel may be inferred which has a width equal to the segment and a cross-section which lies directly beneath the segment. It may be further inferred that if $\phi_A > \phi_B$, the detected tunnel is provided with a linear conductive structure, and if $\phi_A < \phi_B$ the tunnel is not so provided.

To determine the general direction of tunnel 14 beneath area 10, measurements may be made at a second succession of points on the side of conductor 16 opposite from the first succession. To more precisely determine the direction and width, or horizontal position, of tunnel 14, conductor 16 may be successively relocated and phase measurements made along lines parallel to successive relocations.

It may be noted that while the disclosed embodiment of the invention is most sensitive when the angle between the direction of conductor 16 and the direction of the tunnel is 90°, an embodiment of the invention may be capable of detecting a tunnel which is not at right angles with conductor 16. In a modification of the invention, e.g., for determining the presence or absence of a tunnel beneath an area wherein the direction of the tunnel is entirely unknown, two conductors 16 may be placed at right angles to one another and successive differential phase angle measurements made. It may be further noted that the sensitivity of the disclosed embodiment to detect a tunnel may be kept constant by adapting frequency $f$ to tunnel depth, frequency being decreased as tunnel depth increases.

Figure 2:
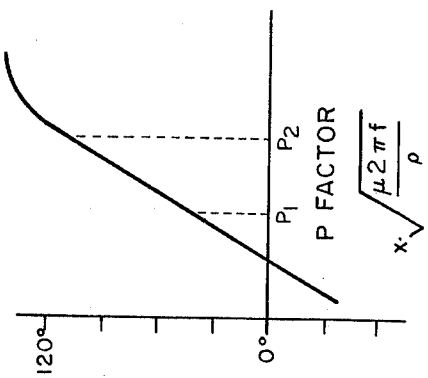
FIG. 2 shows a curve illustrating principles of the embodiment of FIG. 1.

Referring to FIG. 2, there is shown a curve illustrating the relationship between phase difference $\phi$ and "P" factor, wherein the most linear range of the curve occurs between "P" factor values $P_1$ and $P_2$. The sensitivity of the disclosed embodiment of the invention may be maximized by selecting values of $d$ and $f$ which keep values of "P" factor between $P_1$ and $P_2$.

Figure 3:
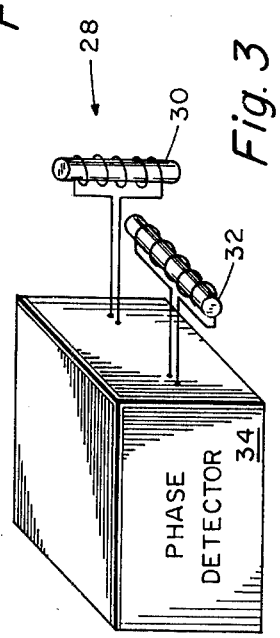
FIG. 3 shows a phase difference measuring means for the embodiment of FIG. 1.

Referring to FIG. 3, there is shown a phase difference measuring means 28 comprising vertical loop antenna 30, horizontal loop antenna 32 and phase detector 34. The vertical component of the magnetic field at a point 26A or 26B induces a current in antenna 30. Similarly, the horizontal component induces a current in antenna 32. Each of the induced currents is coupled into phase detector 34, which may be any one of a number of well known devices, which measures the phase difference between the two induced currents and reads out the phase difference $\phi$ of the magnetic field. An embodiment of phase difference measuring means 28 may be contained in a manually transportable case to facilitate making successive measurements.

Obviously many modifications and variations of the present invention are possible in the light of the above teachings. It is therefore to be understood that within the scope of the appended claims the invention may be practiced otherwise than as specifically described.

What is claimed is:

1. A method for determining the presence of a tunnel beneath the earth surface which comprises the following steps:
    a. generating a magnetic field having a first component and a second component at the earth surface in the general area above which a tunnel is known or suspected to be;
    b. measuring the phase difference between said first component and said second component at selected points along a line parallel to the radiating element of the magnetic field generating means;
    c. observing the measured phase difference as inferring the presence of a tunnel when there is an abrupt change in the measured phase difference; and
    d. varying the frequency of said magnetic field inversely proportional to tunnel depth whereby sensitivity to tunnel detection is kept constant by decreasing the frequency of said magnetic field as the distance between the earth surface and the detected tunnel increases and by increasing the frequency of said magnetic field as the distance between earth surface and the detected tunnel decreases.

* * * * *